No. 794,597.

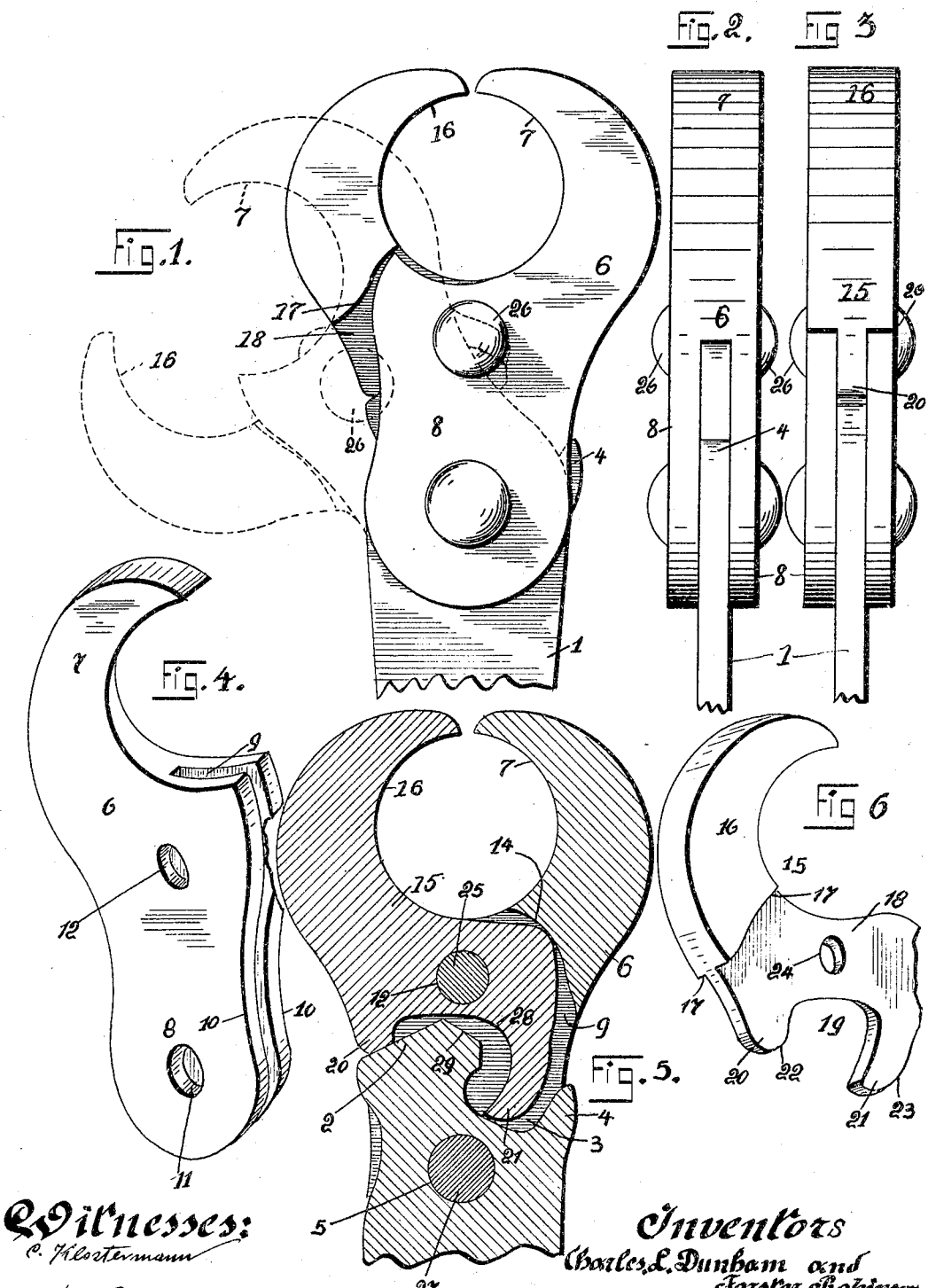

Patented July 11, 1905

UNITED STATES PATENT OFFICE.

CHARLES L. DUNHAM, OF CENTERVIEW, OHIO, AND FORSTER ROBINSON, OF SISTERSVILLE, WEST VIRGINIA.

TONGS.

SPECIFICATION forming part of Letters Patent No. 794,597, dated July 11, 1905.

Application filed September 27, 1904. Serial No. 226,163.

*To all whom it may concern:*

Be it known that we, CHARLES L. DUNHAM, residing at Centerview, in the county of Monroe and State of Ohio, and FORSTER ROBINSON, residing at Sistersville, in the county of Tyler and State of West Virginia, citizens of the United States of America, have invented certain new and useful Improvements in Tongs, of which the following is a specification, reference being had therein to the accompanying drawings.

This invention relates to certain new and useful improvements in tongs; and the primary object of the invention is to provide a pair of tongs which will consist of as few parts as possible, whereby the expense of manufacturing said tongs will be reduced to a minimum, at the same time maintaining a strong and durable construction which will withstand the rough usage to which tongs of this character are subjected.

Another object of this invention is to provide a pair of tongs which will be extremely simple to manipulate, the movement of the jaws being controlled by the movement of the handle of said tongs.

In constructing our improved tongs we have formed the same of three forgings or castings, which are pivotally secured together, these castings or forgings being so shaped that the movement of the handle of our improved tongs will determine the position and movement of the jaws or other pieces of our improved tongs.

The jaws of our improved tongs are so constructed that an oscillatory movement of the handle will open or close one of the jaws of our improved tongs, and in the following detail description of our improved tongs we desire to call attention to the simple construction employed in producing our improved tongs.

With the above and other objects in view the invention consists in the novel construction, combination, and arrangement of parts to be hereinafter more fully described, and specifically pointed out in the claims.

In describing the invention in detail reference is had to the accompanying drawings, forming a part of this application, and wherein like numerals of reference indicate like parts throughout the several views, in which—

Figure 1 is a top plan view of our improved tongs, a portion of the handle being broken away. Fig. 2 is an edge view, looking at the one edge, of our improved tongs. Fig. 3 is an edge view of the opposite edge of our improved tongs. Fig. 4 is a detail perspective view of one of the jaws of our improved tongs. Fig. 5 is a vertical transverse sectional view of our improved tongs, and Fig. 6 is a detail perspective view of the other of said jaws employed in connection with our improved tongs.

The tongs as contemplated by us comprise a handle 1, which may be made of a casting or, if it be desired, may be stamped from heavy sheet-steel. The upper end of this handle, as illustrated in Fig. 5 of the drawings, is of a peculiar formation, and in describing the contour of the same we will point out the different surfaces of the handle which are brought into use when operating or using our improved tongs. The upper end of the handle is formed with an inclined surface 2, the inclined or beveled surface being formed at an angle to the end of said handle and the side thereof. The handle is provided with a concave recess 3, the provision of which forms a projection 4. An aperture 5 is provided in the end of the handle, whereby one of the jaws may be connected to said handle. One of the jaws, as designated by reference-numeral 6, comprises a gripping curved portion 7, and the body portion 8 of said jaw is provided with a cut-away portion 9, providing depending side walls 10 10. The ends of the side walls are provided with horizontally-alined apertures 11 11, and the side walls centrally of said jaw are provided with similar apertures 12 12. When providing the cut-away portion 9, the curved surface 14 is formed at the base of the gripping curved portion 7. The reference-numeral 15 designates the other of said jaws employed in connection with our improved wrench. This jaw is also formed of a curved gripping portion 16, and the body portion of said jaw is cut away, as indicated at 17 17, forming a web portion 18. This web portion is of a peculiar formation, and the end thereof is provided with a recess 19. The provision of this recess forms depending lugs 20 21, said lugs being provided, respectively, with the cam-surfaces 22 and 23. The reference-numeral 24 designates an aperture which is formed in the web portion of said jaw.

To assemble the different parts of our improved tongs, the jaw 15 is pivoted in the cut-away portion 9 of the jaw 6 by a pin 25, the ends of said pin being formed with enlarged portions 26 26, whereby the two jaws will be prevented from becoming disengaged from one another. The handle 1 is then inserted between the side walls 10 10, and a pin 27 is placed in the apertures 11 and 5, and the ends of said pin are treated similarly to the pin 25, heretofore described.

The operation of our improved tongs and the function of the recesses and curved surfaces of each part is as follows: We will assume that the jaws of our improved tongs are in a closed position, as shown in full lines in Fig. 1 of the drawings, and it is desired to open the same. The handle 1 is moved to the left, which will cause the jaws to assume a position at an angle to the handle, as illustrated in dotted lines in Fig. 1 of the drawings. When assuming this position, the handle will swing upon the pin 27, the curved surface 28 of the recess 19 will be engaged by that portion of the handle designated by reference-numeral 29, and as this portion of the handle travels upon the curved surface 28 the jaw 15 will be swung open, swinging upon the pin 25, carried by the jaw 6. This movement will cause the beveled face 22 of lug 20 to pass down the beveled or inclined surface 2 of the handle, and the operation of closing the jaws of our improved tongs is as follows: When the handle 1 is again moved into alinement with the body portion 8 of the jaw 6, the beveled surface 2 of the handle engages the lug 20 and forces the same upwardly, swinging the jaw 15 upon the pin 25 until the projection 4 engages the depending cam-face 23 of lug 21 and limits the movement of the handle toward the right.

It will be seen from the foregoing description that the manipulation of our improved tongs is extremely simple and that only a small portion of the jaws and handle are employed as bearing-surfaces when operating the tongs to an open or closed position. These bearing-surfaces may be hardened, whereby the life of the tongs will be prolonged.

While we have herein shown the gripping-surfaces of the jaws as being smooth, we wish it to be understood that the gripping-surfaces of said jaws may be corrugated, knurled, or notched, whereby the efficiency of the gripping power of said jaws will be increased.

It will be noted that various changes may be made in the details of construction without departing from the general spirit of our invention.

Having fully described our invention, what we claim as new, and desire to secure by Letters Patent, is—

1. In a tongs the combination of a slotted stationary jaw, a handle pivotally mounted in said slotted jaw, and a movable jaw also pivotally mounted in said slotted jaw, the said handle being formed with an inclined surface and a projection at its upper end, and a lug and a projection on the lower end of the movable jaw, whereby when the handle is moved in one direction in the stationary jaw, the movable jaw will be opened by engagement of the projection on the handle with the projection on the movable jaw, and when the handle is moved in the reverse direction, the movable jaw will be closed by the engagement of the inclined surface on the handle with the lug on the movable jaw.

2. In a tongs the combination of a slotted stationary jaw, a handle pivotally mounted in said slotted jaw, and a movable jaw also pivotally mounted in said slotted jaw, the said handle being formed with an inclined surface at its upper end abutting against a lug formed on said movable jaw, and having a projection at said upper end, the said handle being also formed with a side projection, and the said movable jaw having a projection to be engaged by the projection on the handle when the latter is moved in one direction to open the movable jaw and engaged by the side projection of the handle when the latter is moved in the reverse direction, and said movable jaw also having a lug coacting with the inclined surface of the handle to close the movable jaw.

In testimony whereof we affix our signatures in the presence of two witnesses.

CHARLES L. DUNHAM.
FORSTER ROBINSON.

Witnesses:
NELL G. BLACK,
J. FRED NEILL.